United States Patent
Siebenmorgen et al.

(10) Patent No.: US 11,555,991 B2
(45) Date of Patent: Jan. 17, 2023

(54) METHOD FOR ILLUMINATING SAMPLES IN MICROSCOPIC IMAGING METHODS

(71) Applicant: Carl Zeiss Microscopy GmbH, Jena (DE)

(72) Inventors: Joerg Siebenmorgen, Jena (DE); Ralf Netz, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 143 days.

(21) Appl. No.: 17/057,847

(22) PCT Filed: May 24, 2019

(86) PCT No.: PCT/EP2019/063443
§ 371 (c)(1),
(2) Date: Nov. 23, 2020

(87) PCT Pub. No.: WO2019/228919
PCT Pub. Date: Dec. 5, 2019

(65) Prior Publication Data
US 2021/0199942 A1     Jul. 1, 2021

(30) Foreign Application Priority Data

May 31, 2018  (DE) .................... 10 2018 113 054.6

(51) Int. Cl.
*G02B 21/06* (2006.01)
*G02B 21/00* (2006.01)

(52) U.S. Cl.
CPC ......... *G02B 21/0032* (2013.01); *G02B 21/06* (2013.01); *G02B 21/0076* (2013.01)

(58) Field of Classification Search
CPC ............... G02B 21/0032; G02B 21/06; G02B 21/0076; G02B 21/00; G02B 21/0004;
(Continued)

(56) References Cited

U.S. PATENT DOCUMENTS

2003/0132394 A1*  7/2003  Wolleschensky .. G01N 21/6458
                                               250/458.1
2008/0073486 A1    3/2008  Liang
(Continued)

FOREIGN PATENT DOCUMENTS

CN           103917914 B   * 11/2016  ........... B23K 26/032
DE    10 2014 119 027 A1    6/2016
(Continued)

OTHER PUBLICATIONS

German Search Report for Priority Document DE 10 2018 113 054.6 dated Feb. 20, 2019.
(Continued)

*Primary Examiner* — Arnel C Lavarias
(74) *Attorney, Agent, or Firm* — Duane Morris LLP; Arthur M. Dresner (57) ABSTRACT

A method for illuminating samples in microscopic imaging methods, wherein a number m of different wavelengths $\lambda_i$, with m>1 and i=1, ..., m, is selected for the illumination. For each of the wavelengths $\lambda_i$ a target phase function $\Delta\varphi_i(x, y, \lambda_i)$ is predefined, wherein x and y denote spatial coordinates in a plane perpendicular to an optical axis z and each target phase function $\Delta\varphi_i(x, y, \lambda_i)$ is effective only for the corresponding wavelength $\lambda_i$. The target phase functions $\Delta\varphi_i$ are predefined depending on the structure of the sample and/or the beam shape and/or illumination light structure to be impressed on the light used for illumination. A total phase mask is then produced which realises all target phase functions $\Delta\varphi_i(x, y, \lambda_i)$. This total phase mask is then illuminated simultaneously or successively with coherent light of wavelengths $\lambda_i$ such that the predefined structure of the illumination light is generated in the region of the sample.

10 Claims, 8 Drawing Sheets

(58) Field of Classification Search
CPC .............. G02B 21/002; G02B 21/0024; G02B 21/0052; G02B 21/0056; G02B 21/0064; G02B 21/0072; G02B 21/008; G02B 21/36; G02B 21/361; G02B 21/365; G02B 21/367; G02B 27/0012
USPC ................ 359/385, 362, 363, 368, 369, 388
See application file for complete search history.

(56) References Cited

U.S. PATENT DOCUMENTS

| | | | |
|---|---|---|---|
| 2015/0168732 A1 | 6/2015 | Singer et al. | |
| 2015/0248015 A1 | 9/2015 | Schwedt et al. | |
| 2016/0131885 A1 | 5/2016 | Nakayama et al. | |
| 2016/0301914 A1* | 10/2016 | Shechtman | G02B 21/0056 |
| 2018/0081159 A1 | 3/2018 | Lippert et al. | |
| 2018/0164564 A1 | 6/2018 | Siebenmorgen | |

FOREIGN PATENT DOCUMENTS

| | | | |
|---|---|---|---|
| DE | 10 2015 103 802 A1 | 9/2016 | |
| DE | 10 2015 209 758 A1 | 12/2016 | |
| DE | 10 2017 109 645 A1 | 11/2018 | |
| WO | 2014 005682 A2 | 1/2014 | |
| WO | 2014 017067 A1 | 1/2014 | |
| WO | 2014 060270 A2 | 4/2014 | |
| WO | WO-2016146503 A1 * | 9/2016 | ............. G02B 21/10 |
| WO | 2018 202466 A1 | 11/2018 | |

OTHER PUBLICATIONS

Written Opinion of the International Searching Authority for International Application PCT/EP2019/063443 dated Sep. 2, 2019.
International Search Report for International Application PCT/EP2019/063443 dated Sep. 2, 2019.
Schechtman, et al.; "Multicolour Localization Microscopy by Point-Spread-Function Engineering"; Nature Photonics 2016; 10(9):590-594.
Wang, et al.; "Chromatic-aberration-corrected diffractive lenses for ultra-broadband focusing"; Scientific Reports 2016; 6(1):DOI:10.1038/srep21545.
Millan, et al.; "Chromatic compensation of programmable Fresnel lenses"; Optics Express 2006; 14(13):6226-6242.
Notification of Transmittal of English Translation of International Preliminary Report on Patentability for International Application PCT/EP2019/063443 dated Dec. 10, 2020.
English Translation of International Preliminary Report on Patentability for International Application PCT/EP2019/063443 dated Dec. 1, 2020.

* cited by examiner a)

METHOD FOR ILLUMINATING SAMPLES IN MICROSCOPIC IMAGING METHODS

RELATED APPLICATIONS

The present application is a U.S. National Stage application of International PCT Application No. PCT/EP2019/063443 filed on May 24, 2019, which claims priority benefit of German Application No. DE 10 2018 113 054.6 filed on May 31, 2018, the contents of each are incorporated by reference in their entirety.

FIELD OF THE INVENTION

The invention relates to a method for illuminating samples within the scope of a microscopic examination of samples, in general, using microscopic imaging methods.

BACKGROUND OF THE INVENTION

Advanced microscopic imaging methods use complex illumination processes in order to be able to examine samples even better and in more detail and in order to recognize more details than in the case of conventional reflected light or transmitted light microscopes. By way of example, a sample can be illuminated in structured fashion in order to increase the spatial resolution in image representations. Light sheet microscopes, to mention a further example, allow the selective illumination of samples in narrow planes, facilitating the creation of very detailed sample images. Additionally, the light sheets can also be structured. Finally, in the field of confocal microscopy, a higher temporal resolution than when using just a single light spot can be obtained by means of multispot laser scanning microscopy. The illumination is carried out with coherent light, which is provided by lasers, in all cases.

As a rule, these methods only operate in optimal fashion if the illumination is implemented with light of only a single wavelength. If light of a plurality of wavelengths is used at the same time, this leads to losses in the resolution and/or the accuracy of the imaging, even in the case of coherent light. The reason for this lies in the wavelength-dependence of the imaging behavior of the optical elements, as a result of which, for example, the relative focal positions of lenses lie at different positions along the optical axis. If use is made of diffractive phase gratings in intermediate image planes, as are used, for example, for the generation of structured illumination light in microscopy, for beam shaping in light sheet microscopy or for generating a light spot array in laser scanning microscopy, then the orders of diffraction for different wavelengths do not lie congruently in a pupil plane in the far field, i.e., with a significant distance from the phase grating, perpendicular to the optical axis but they have different distances from said optical axis. This is due to the fact that the refractive indices of the optical material used depend on the wavelength and the same grating, the same geometric microstructure, is used for all wavelengths.

A further problem arising in structured illumination microscopy (SIM) is that at least three gratings with differently directed grating vectors must be used for the alignment and the phase of the illumination modulation in the intermediate image plane so that an increase in resolution with a maximized signal-to-noise ratio is obtained in the entire recorded sample plane, independently of the direction. The prior art has disclosed various approaches for changing the grating direction in the sample space. By way of example, use can be made of optical image field rotators, such as Abbe-König prisms. This method is disadvantageous in that it is relatively slow and, under certain circumstances, can also generate reflections of the illumination light. Use can also be made of superposed, differently directed gratings, which are arranged on a substrate. However, since only one grating direction should be used at any one time in the sample space in order to have an optimal signal-to-noise ratio, losses of laser power arise here as a result of the masking of unused grating directions. Optical beam splitting for generating interfering beams is also possible; however, the structure is complicated and time-consuming and costly. In the simplest case, use can also be made of a plurality of differently directed gratings on a motor-driven grating interchanger; however, this method is very slow and therefore less suitable for the analysis of biological samples, in particular.

Photonic integrated circuits (PICs) have also been used to generate the structured illumination for quite some time now; the orders of diffraction of the gratings and the phase-shifting functions can be adjusted with the aid thereof. Although this approach facilitates the production of compact SIM illumination modules, it is technologically demanding. In this process, the orders of diffraction are generated by geometric wavefront splitting in waveguides, in so-called splitters. By way of example, the phase shift is realized by thermo-optic or electro-optic path length changes for the illumination light in the waveguides downstream of the wavefront splitting in the splitters. By way of example, such an approach is described in WO 2014/060270 A1. A fast switch selectively couples illumination light into an optical fiber. The optical fiber is connected to an integrated optical waveguide chip (PIC). The input coupled laser light impinges on a first waveguide splitter in the chip, said waveguide splitter splitting off part of the laser light—as a rule, between 5% and 10%—coherently for the purposes of generating a light spot in the central region on the optical axis in a pupil plane; this central light spot spatially corresponds to the 0th order of diffraction of a fictitious grating in an intermediate image plane. While the smaller split-off light component propagates in the direction of the chip output, the remaining larger light component is split in half before it reaches the chip output. Then, three coherently coupled light beams are available at the output of the waveguide chip; in the pupil plane, the two outer light beams are arranged in a line with the central light beam and at the same distance from the latter and consequently replace the three orders of diffraction of a grating imagined to be in an intermediate image plane, said grating being required for the generation of structured illumination. Since the orders of diffraction are generated directly and not with the aid of a grating, reference is also made to "quasi orders of diffraction".

An advantage of the process for structured illumination microscopy based on the use of waveguide chips consists of the fact that the "quasi orders of diffraction" have the same positions in respect of an optical axis in a pupil plane, independently of the illumination wavelength, and so the limit frequency of an objective, with which a sample is illuminated, can be achieved for a plurality of illumination wavelengths, and consequently an increase in resolution can also be achieved. Thus, the quasi orders of diffraction of different wavelengths lie congruently on one another in the pupil plane.

A development is described in DE 10 2017 109 645.0, which does not have an earlier publication date; here, the output-side fibers on the waveguide chip can be dispensed with. However, the structure is relatively complicated, in particular if three beam splitters are integrated in a plane.

The structuring or shaping of the light is linked to large technical outlay in other fields, too, particularly if a plurality of wavelengths should be used. By way of example, to generate a multicolored light sheet in light sheet microscopy, use is made of a beam shaping module which converts a light beam with an intensity profile corresponding to a Gaussian distribution into a so-called $\text{sinc}^3$ beam. By way of example, this is described in WO 2014/005682 A1. To generate a multicolored light sheet, the incident laser radiation, which still has a Gaussian intensity profile, is split into partial beam paths according to its wavelengths with the aid of a dichroic beam splitter. These are guided separately from one another to different points on a spatial light modulator (SLM). An optimal, locally restricted phase pattern can be displayed on the spatial light modulator for each wavelength, said phase pattern optimally converting the respective Gaussian beam into a $\text{sinc}^3$ beam. Following the conversion, the beams generated separately for each wavelength are recombined to form a single beam. This equally allows the generation of a structured light sheet, as described in DE 10 2015 103 802 A1, for example. The beam shaping module is complicated in terms of its production and hence costly.

The article "*Multicolour Localization Microscopy by Point-Spread-Function Engineering*" by Y. Shechtman et al., published in Nature Photonics 10, pp. 590-594 in 2016, describes a method in which a multichromatic phase function is calculated for a spatial light modulator in order to generate wavelength-dependent shaping of the point spread function.

OBJECT OF THE INVENTION

It is an object of the invention to develop a method with which the generation of structured illumination light or, in general, beam shaping can be simplified when using coherent light of a plurality of wavelengths and with which structurally complex measures can be dispensed with such that the same accuracy and resolution can be achieved as in the case where light of only one wavelength is used.

This object is achieved by virtue of an optimized overall phase mask, which generates the desired illumination in the sample region for all wavelengths, initially being determined by calculation. The following procedure is used in the process: Initially, the wavelengths intended to be used for the illumination are selected. In general, a number of m different wavelengths $\lambda_i$ are selected for illumination purposes, with a natural number m>1 and a running index i=1, . . . , m; i.e., at least two wavelengths are selected. A target phase function $\Delta\varphi_i(x, y, \lambda_i)$ is specified for each of the wavelengths $\lambda_i$. The label $\Delta\varphi_i$ was chosen to clarify that the target phase function is a shift in the phase, a phase deviation in relation to the uninfluenced propagation of the light. x and y are spatial coordinates in a plane perpendicular to the optical axis, which is denoted by z. As a rule, the target phase functions $\Delta\varphi_i(x, y, \lambda_i)$ differ from one another, reflecting the dependence on the wavelength. Here, each target phase function $\Delta\varphi_i(x, y, \lambda_i)$ effectively only acts for the respective wavelength $\lambda_i$ and effectively develops no effect for other wavelengths, at least from the number of m wavelengths. This means that the target phase function $\Delta\varphi_i(x, y, \lambda_i)$ either does not change the phase or only changes the phase by multiples of $2\pi$ (for other wavelengths than $\lambda_i$—at least the wavelengths contained in the number m, which are likewise used for the illumination. Such a phase deviation is not noticeable in the illumination light, which corresponds to an effective non-effect of the target phase function on these wavelengths. To prevent a target phase function from acting on two wavelengths situated very close together, use has to be made either of a material with a high refractive index or of a thick material. The closer two wavelengths are together, the higher the refractive index or the thicker the material has to be so that, where necessary, a plurality of periods of the wavelengths are included.

Here, the target phase functions can be specified in various ways. By way of example, they can be specified on the basis of a structure of the sample, i.e., the illumination is specifically adapted to the structure of the sample. It can also be specified on the basis of a beam shape to be impressed upon the illumination light—the light of various wavelengths used for illumination purposes—for example if the sample should be illuminated by a light sheet. Finally, it can also be specified on the basis of an illumination light structure to be impressed upon the illumination light, in particular for the purposes of increasing the resolution. A combination of these specifications for the target phase functions is readily possible, for example if the sample should be illuminated by a structured light sheet.

As a rule, the target phase functions for each individual wavelength can be determined analytically. By way of example, if quasi orders of diffraction are specified in a pupil plane, the structure of a diffraction grating can be determined therefrom in each case, in the form of an amplitude and phase mask or a pure phase mask, which would have to be arranged in an intermediate image plane, using processes known from the prior art. However, a target phase function could also be calculated from an intensity distribution using a Gerchberg-Saxton algorithm. The target phase functions $\Delta\varphi_i$ are determined separately for each wavelength $\lambda_i$.

Then, an overall phase mask this should also comprise combined amplitude and phase masks but at least pure phase masks is generated on the basis of the target phase functions, said overall phase mask realizing the individual target phase functions $\Delta\varphi_i(x, y, \lambda_i)$, of which there are m overall. To this end, use can be made of one or more optically effective materials with possibly different thicknesses also thicknesses varying in the location-dependent fashion which are combined to form a layer stack. In the simplest case, use is made of a single material with a constant or location-dependent thickness. If a material with a constant thickness is used, this necessarily implies a location-dependent and wavelength-dependent refractive index, which need not necessarily be realized by a specific material having the desired properties but which can advantageously be realized by other optical elements, such as spatial light modulators, for example.

Finally, the sample is illuminated simultaneously or successively with coherent light of various wavelengths $\lambda_i$—the illumination light—through the overall phase mask generated thus.

Expediently, the overall phase mask is generated by calculation. In a preferred embodiment, the target phase functions $\Delta\varphi_i(x, y, \lambda_i)$ are then included in the following system of equations, denoted G1:

$$\begin{pmatrix} \frac{\Delta\varphi_1(x, y, \lambda_1)}{2\pi} \\ \frac{\Delta\varphi_2(x, y, \lambda_2)}{2\pi} \\ \vdots \\ \frac{\Delta\varphi_m(x, y, \lambda_m)}{2\pi} \end{pmatrix} = \tag{G1}$$

-continued $$\begin{pmatrix} \frac{(n_1(\lambda_1)-1)}{\lambda_1} & \frac{(n_2(\lambda_1)-1)}{\lambda_1} & \cdots & \frac{(n_m(\lambda_1)-1)}{\lambda_1} \\ \frac{(n_1(\lambda_2)-1)}{\lambda_2} & \frac{(n_2(\lambda_2)-1)}{\lambda_2} & \cdots & \frac{(n_m(\lambda_2)-1)}{\lambda_2} \\ \vdots & \vdots & \ddots & \vdots \\ \frac{(n_1(\lambda_m)-1)}{\lambda_m} & \frac{(n_2(\lambda_m)-1)}{\lambda_m} & \cdots & \frac{(n_m(\lambda_m)-1)}{\lambda_m} \end{pmatrix} \begin{pmatrix} D_1 \\ D_2 \\ \vdots \\ D_m \end{pmatrix}$$

This system of equations must be satisfied at least approximately if the solution is determined iteratively and not analytically. Here, $D_i$ denotes the thickness of an optically effective material $M_i$, which can be location-dependent or constant. The optically effective material $M_i$ has a wavelength-dependent refractive index Whether the thickness $D_i$ is location-dependent in x and y or constant depends on the technology used for realizing the overall phase mask; this will be discussed further below. Should the thickness $D_i$ be constant, the refractive index $n_i$ is location-dependent in x and y instead.

Then, an overall phase mask realizing the target phase functions $\Delta\varphi_i(x, y, \lambda_i)$ is generated on the basis of the solution to the system of equations G1. In the most general case, the solution of the system of equations yields a number of materials with location-dependent thicknesses and different, but location-independent refractive indices. An ideal overall phase mask as a diffraction grating, which realizes all phase shifts specified by the target phase functions $\Delta\varphi_i(x, y, \lambda_i)$, is then generated as a stack of the materials M with the respective location-dependent thicknesses $D_i(x, y)$. Provided the refractive indices of known materials were specified, such an overall phase mask can also be physically produced as a matter of principle. If the overall phase mask is generated as a stack of real materials, the materials can be in contact with one another. Other ways of generating the overall phase mask using a material of constant thickness are described further below.

If a periodicity of the target phase functions of $2\pi$ is assumed and if multiples of this periodicity are ignored, it is possible to analytically solve the system of equations for two wavelengths. If two target phase functions $\Delta\varphi_1(x, y, \lambda_1)$ and $\Delta\varphi_2(x, y, \lambda_2)$ are correspondingly specified for two wavelengths $\lambda_1$ and $\lambda_2$, the location-dependent thicknesses $D_1$ and $D_2$ of two materials $M_1$ and $M_2$ are then obtained as solutions in accordance with formulas G2 and G3:

$$D_1(x,y) = \frac{\Delta\varphi_2(x,y,\lambda_2) - \left(\frac{\lambda_1(n_1(\lambda_2)-1)}{\lambda_2(n_1(\lambda_1)-1)}\right) \cdot \Delta\varphi_1(x,y,\lambda_1)}{\frac{2\pi}{\lambda_2} \cdot (n_2(\lambda_1)-1) \cdot \left(\frac{(n_2(\lambda_2)-1)}{(n_2(\lambda_1)-1)} - \frac{(n_1(\lambda_2)-1)}{(n_1(\lambda_1)-1)}\right)} \quad (G2)$$

$$D_2(x,y) = \frac{\Delta\varphi_1(x,y,\lambda_1) \cdot \left(\frac{(n_2(\lambda_2)-1)}{(n_2(\lambda_1)-1)}\right) - \frac{\lambda_2}{\lambda_1}\Delta\varphi_2(x,y,\lambda_2)}{\frac{2\pi}{\lambda_1} \cdot (n_1(\lambda_1)-1) \cdot \left(\frac{(n_2(\lambda_2)-1)}{(n_2(\lambda_1)-1)} - \frac{(n_1(\lambda_2)-1)}{(n_1(\lambda_1)-1)}\right)} \quad (G3)$$

In this case, the overall phase mask would be a stack of both materials. However, connecting two materials with irregularly formed surfaces to one another in order to generate a layer stack may be fraught with difficulties in practice. Moreover, the use of many wavelengths requires a corresponding number of layers in the stack, which may lead to space problems in the beam path since the stack must be arranged in an intermediate image plane.

Therefore, in a preferred configuration of the method, the same optically effective material M with a location-dependent thickness $D(x,y)$ is used for all wavelengths $\lambda_i$, wherein a non-uniqueness of the phase in multiples of $2\pi$ is assumed and exploited; by way of example, if two of the wavelengths from the number m are located close to one another, the thickness can comprise a plurality of periods—multiples of $2\pi$—of the wavelength in order to exclude an interaction of the target phase functions. Since use is made of only one material, a corresponding physical overall phase mask can be produced and arranged in the beam path more easily.

For—purely by way of example—one material and two wavelengths, i.e., m=2, the system of equations (G1) is simplified in this case to the following system of equations G4:

$$\begin{pmatrix} \frac{\Delta\varphi_1(x,y,\lambda_1)}{2\pi}+l \\ \frac{\Delta\varphi_2(x,y,\lambda_2)}{2\pi} \end{pmatrix} = \begin{pmatrix} \frac{\Delta n_d(\lambda_1)}{\lambda_1}-1 \\ \frac{\Delta n_d(\lambda_2)}{\lambda_2}-1 \end{pmatrix} \begin{pmatrix} D(x,y) \\ j \end{pmatrix} \quad (G4)$$

The variables l and j, as natural numbers, take account of the fact here that the target phase functions have a non-uniqueness in multiples of $2\pi$, i.e., the phase is unique apart from multiples of $2\pi$.

If the thickness D is location-dependent, $\Delta n_d(\lambda_i)$ denotes the refractive index difference in the material M from air in this case, i.e.:

$$\Delta n_d(\lambda_i) = (n_d(\lambda_i) - 1) \quad (G5)$$

The above-described configurations of the method, in which the thickness of the material of the overall phase mask is location-dependent but the refractive index is not, are particularly suitable if use should be made of a physical phase mask made of, for example, a glass with a corresponding refractive index—the latter can be entered as a parameter prior to the calculation. Particularly if use is made of only a single material, the production is associated with little outlay and therefore cost-effective. However, if the illumination is changed and should only one wavelength that differs from the wavelengths for which the phase mask made of glass is designed be used, then the phase mask has to be changed. However, this time may not be available, especially when examining living samples.

Therefore, in a particularly preferred configuration of the method, a transmissive spatial light modulator or a liquid crystal layer arranged on a silicon substrate (LCOS) with a constant thickness as part of a spatial light modulator (SLM) is used as optically effective material M. Since the thickness of the material is constant in this case, the refractive index is set to be location-dependent in order to ensure the corresponding phase shift that varies spatially in x and y; then, the phase is set by way of a refractive index difference $\Delta n$ that depends on a voltage U applied in location-dependent fashion and a dedicated, local voltage can be specified for each of the liquid crystal cells, arranged in the form of an array in x and y, in the SLM. Then, the equation G4 simplifies for one wavelength $\lambda_i$ to form equation G6:

$$\Delta\varphi_i(x,y,\lambda_i) = \frac{2\pi}{\lambda_i} \cdot \Delta n(\lambda_i, U) \cdot D_{LC} \quad (G6)$$

Now, the refractive index difference $\Delta n$ is no longer that from equation G5, where use was made of the difference between the refractive index $n_d$ of the material M with the thickness D and the refractive index of air; instead, this is the voltage-dependent difference, which arises from the optical anisotropy of the liquid crystal cells as per equation G7:

$$\Delta n(\lambda, U) = \frac{n_{LC}^e(\lambda)}{\sqrt{1 + \left\{\left(\frac{n_{LC}^e(\lambda)}{n_{LC}^o(\lambda)}\right)^2 - 1\right\}\cos^2(\theta(U))}} - n_{LC}^o(\lambda) \approx \Delta n(\lambda) \cdot f(U) \quad (G7)$$

In equation G6, $D_{LC}$ denotes thickness of the liquid crystal cell. In equation G7, $n^o$ denotes the ordinary refractive index of the liquid crystal, i.e., for light polarized perpendicular to the molecule longitudinal axis of the aligned liquid crystal molecules. $n^o{}_{LC}$ denotes the extraordinary refractive index, which is decisive for light polarized parallel to the molecule longitudinal axis or, in general, the director position of the liquid crystal. $\theta(U)$ denotes the voltage-dependent angle of incidence of the liquid crystal molecules. The refractive index ellipsoid rotates with the liquid crystal molecules. U itself is a location-dependent voltage—discrete in this case. Additionally, the refractive index naturally also depends on the wavelength on account of the dispersion; i.e., it is different in the same material for the various wavelengths or colors.

The algorithm disclosed in the aforementioned article by Y. Shechtman et al. can be resorted to for the purposes of iteratively solving the system of equations.

EMBODIMENTS OF THE INVENTION

A few particularly preferred configurations of the method, which also describe practical examples, are discussed below.

In a preferred configuration of the method, a resolution-increasing illumination light structure is impressed on the illumination light; i.e., the illumination light is structured, which, as a rule, is achieved by diffracting the light or simulating the diffraction, as explained at the outset. Expediently, the illumination light structure then comprises, for each of the wavelengths $\lambda_i$, at least two diffraction maxima, differing from the 0th order, corresponding to two orders of diffraction which are arranged in a common pupil plane. Here, this is the −1st and the 1st order of diffraction. The diffraction maxima of the 0th order of diffraction—if present—lie congruently on the optical axis and are masked where necessary. The three diffraction maxima—more precisely "quasi diffraction maxima"—of each wavelength are respectively located in a straight line in each case.

Then, in a first alternative, the target phase functions are specified in such a way that, in addition to the diffraction maxima of the 0th order, the remaining diffraction maxima of the same order of diffraction for all wavelengths $\lambda_i$ are located congruently on one another along one line. This allows an increase in the resolution in one direction, which is sufficient for the use of a scanning light sheet, for example. In a second alternative, only the diffraction maxima of a zeroth order of diffraction—if present—are located congruently on one another and the remaining diffraction maxima are located on lines that are rotated with respect to one another by an offset angle that depends on the number m of wavelengths $\lambda_i$ used. By way of example, if three wavelengths are used, an offset angle of preferably 120° is chosen; in this way, an increase in the resolution is obtained in all directions in the two-dimensional image plane.

In the case of an examination of marked samples which are excited to fluoresce, it is then expedient to choose the wavelengths of the light used for the structured illumination and for the increase in resolution to be as close to one another as possible so that the same fluorescence is excited with all used wavelengths. By way of example, if an illumination with light with three wavelengths, the orders of diffraction of which are located on lines including an angle of 120° with one another, is sought after, then these three wavelengths should not be spaced apart by more than a few tenths of a nm. Naturally, a plurality of different fluorescence signals can also be excited; in the aforementioned example, six wavelengths would be used for the excitation of two different fluorescence signals, three of said wavelengths respectively lying close together and the orders of diffraction of the respective three wavelengths lying close together lying on different straight lines.

In the case of microscopy by means of structured illumination (SIM), nine images are recorded in the aforementioned example; respectively three thereof with structuring in a different direction. These nine images are subsequently combined by calculation to form an image with a higher resolution. If the phase mask has been produced for three wavelengths lying close together and if use is made of a tunable coherent light source, the necessary images linked to the three modulation directions can be recorded very quickly in succession if the exposure times of a connected camera are synchronized with the tuning, which only needs to take place over a few nm.

In another configuration of the method, the illumination light structure, intended to be impressed upon the illumination light, has, for each of the wavelengths $\lambda_i$, diffraction maxima in the region of the sample that correspond to a Dammann diffraction grating arranged in a pupil plane, the latter being illuminated by a homogeneous light distribution; i.e., it has diffraction maxima as would be generated by a Dammann grating arranged in a pupil plane. This variant is particularly suitable for the multispot excitation in a laser scanning microscope; in contrast to the prior art, this renders it possible for the focusses to lie at the same location independent of the wavelength, should this be desired. The target phase functions are specified in such a way that the respective same orders of diffraction are congruent in the pupil plane, i.e., lie on top of one another, for all wavelengths $\lambda_i$.

In a further configuration of the method, the shape of a multichromatic light sheet, preferably a multichromatic sinc³ beam, which is already structured, is impressed on the illumination light. Complex beam shaping modules, as have been conventional in the prior art up until now, can then be dispensed with.

In a further configuration, which allows a very flexible adaptation to different conditions, an intensity distribution is specified for each one of the wavelengths $\lambda_i$ and the target phase functions $\Delta\varphi_i$, which are entered into the equations G1 or the simplifications thereof, are generated by means of the Gerchberg-Saxton algorithm known from the prior art. This overcomes the disadvantage of the Gerchberg-Saxton algorithm, specifically that phase masks or phase functions can only be calculated for one respective wavelength using this algorithm. Using the process according to the invention, the individual phase patterns can be combined by calculation to form a multichromatic phase pattern. This phase pattern, which is also referred to as an overall phase mask, can then be displayed on a spatial light modulator of an optical manipulator, for example, in order thus to carry out a parallel multichromatic optical manipulation of a sample.

Finally, in a further embodiment of the method, for which, in particular, it is possible to carry out the above-described determination of the target phase functions with the aid of the Gerchberg-Saxton algorithm, the target phase functions $\Delta\varphi_i(x, y, \lambda_i)$ are specified on the basis of the sample structure, specifically by virtue of regions of interest (ROI) first being specified within the sample, wherein these regions of interest may also be different for the different wavelengths $\lambda_i$. Then, an illumination light structure is specified, by means of which only the regions of interest are illuminated. This can also be carried out in tunable fashion again; i.e., the ROI can be examined successively by virtue of the wavelengths used for illumination purposes being tuned.

It is understood that the features specified above and the features yet to be explained below can be used not only in the specified combinations, but also in other combinations or on their own, without departing from the scope of the present invention.

BRIEF DESCRIPTION OF THE DRAWINGS

The invention is explained in even greater detail below for example with reference to the accompanying drawings, which also disclose features essential to the invention. In detail.

DETAILED DESCRIPTION OF THE INVENTION

Described below is a method for illuminating samples in the microscopic imaging method, within the scope of which a number of m wavelengths $\lambda_i$, with m>1 and i=1, ..., m are selected for illumination purposes, wherein for each one of the wavelengths $\lambda_i$ a target phase function $\Delta\varphi_i(x, y, \lambda_i)$ that effectively only acts on this wavelength is specified. Here, x and y denote spatial coordinates in a plane perpendicular to an optical axis z. Here, the target phase functions $\Delta\varphi_i(x, y, \lambda_i)$ are specified on the basis of a structure of the sample and/or a beam shape and/or illumination light structure to be impressed on the illumination light. The target phase functions are used to generate an overall phase mask, by means of which the sample is illuminated simultaneously or successively with coherent light of the wavelengths $\lambda_i$. Here, the target phase functions approximately satisfy the system of equations G1, for example:

$$\begin{pmatrix} \frac{\Delta\varphi_1(x, y, \lambda_1)}{2\pi} \\ \frac{\Delta\varphi_2(x, y, \lambda_2)}{2\pi} \\ \vdots \\ \frac{\Delta\varphi_m(x, y, \lambda_m)}{2\pi} \end{pmatrix} = \tag{G1}$$

$$\begin{pmatrix} \frac{(n_1(\lambda_1)-1)}{\lambda_1} & \frac{(n_2(\lambda_1)-1)}{\lambda_1} & \cdots & \frac{(n_m(\lambda_1)-1)}{\lambda_1} \\ \frac{(n_1(\lambda_2)-1)}{\lambda_2} & \frac{(n_2(\lambda_2)-1)}{\lambda_2} & \cdots & \frac{(n_m(\lambda_2)-1)}{\lambda_2} \\ \vdots & \vdots & \ddots & \vdots \\ \frac{(n_1(\lambda_m)-1)}{\lambda_m} & \frac{(n_2(\lambda_m)-1)}{\lambda_m} & \cdots & \frac{(n_m(\lambda_m)-1)}{\lambda_m} \end{pmatrix} \begin{pmatrix} D_1 \\ D_2 \\ \vdots \\ D_m \end{pmatrix}$$

$D_i$ is the location-dependent or constant thickness of an optically effective material n with a wavelength-dependent refractive index $n_i$. The refractive index $n_i$ itself is only location-dependent if the thickness of the material n is constant. On the basis of the solution to this system of equations G1, an overall phase mask that realizes the target phase shifts $\Delta\varphi_i$ can be generated as a stack of the materials n with the location-dependent thicknesses $D_i(x, y)$. The sample is then illuminated through the overall phase mask; i.e., the overall phase mask is then illuminated simultaneously or successively by a coherent light with the various wavelengths $\lambda_i$ such that, for example, a specified structure of the illumination light is generated in the region of the sample. This method will be explained in more detail below on the basis of simplified embodiments, in which two wavelengths $\lambda_1$ and $\lambda_2$ are used. Moreover, the assumption is made that there is only one material M with the thickness D present; specifically, an LCOS-based spatial light modulator should be used as the latter can be set most flexibly. In this case, the thickness of the material is constant and the refractive index is set in location-dependent fashion in x and y by way of a voltage U that is specified in location-dependent fashion.

DETAILED DESCRIPTION OF THE DRAWINGS

Figure 1:
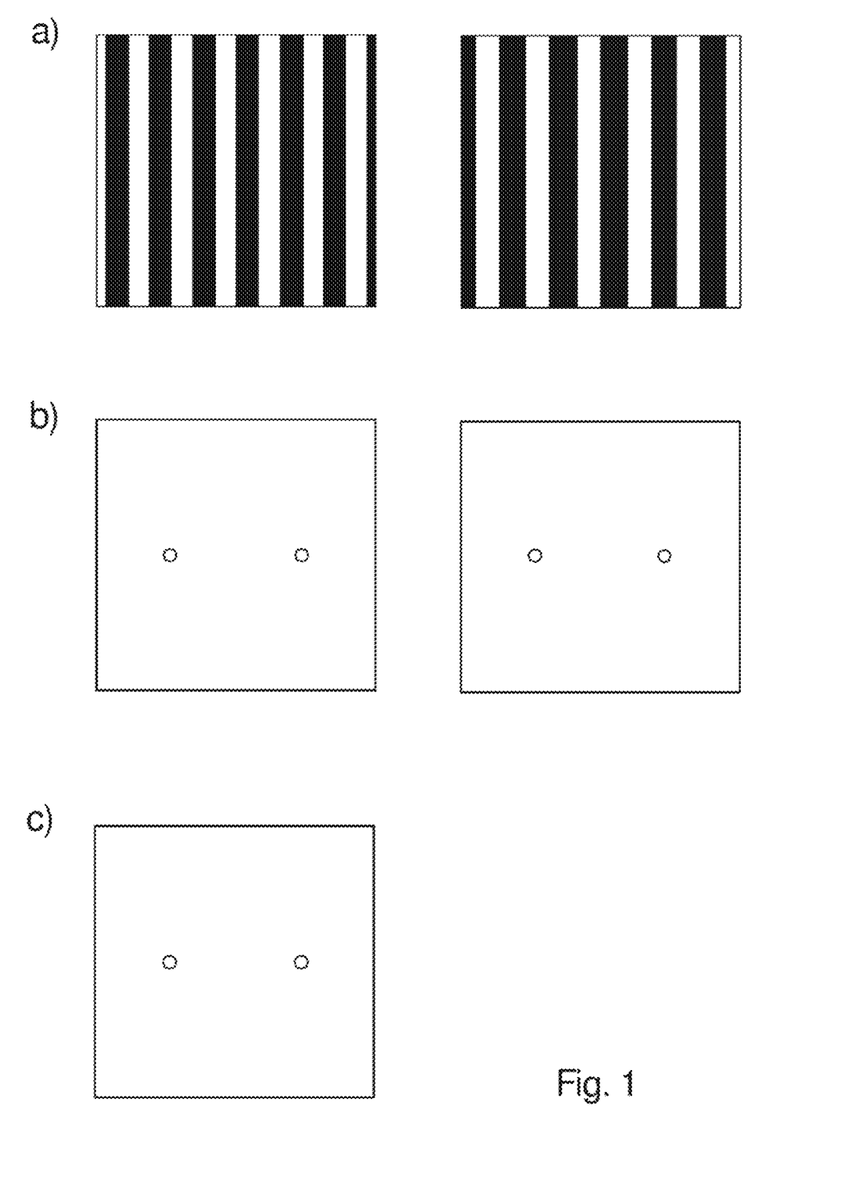
FIG. 1 shows a first example for target phase functions for two wavelengths.

FIG. 1 initially shows, in FIG. 1*a*) on the left-hand side, a target phase function $\Delta\varphi_1$ for a first wavelength $\lambda_1$, for example 488 nm. Shown on the right-hand side is the target phase function $\Delta\varphi_2$ for a second wavelength $\lambda_2$, for example 561 nm. This relates to one-dimensional phase gratings. These phase gratings were specified in such a way that the orders of diffraction shown in FIG. 1*b*)—this relates to the −1st and 1st order of diffraction—are congruent for the two wavelengths $\lambda_1$ and $\lambda_2$, i.e., the diffraction angles are identical. Since the wavelengths are different, the periods of the phase gratings must likewise be different. The diffraction patterns shown in FIG. 1*b*) arise in the far field, i.e., at a certain distance from the phase grating. If the phase grating is respectively arranged in an intermediate image plane, the diffraction patterns are located in a pupil plane. A superposition of the two diffraction patterns shown in FIG. 1*b*) is shown in FIG. 1*c*). The masks can be calculated from specified diffraction patterns, for example with the aid of a Gerchberg-Saxton algorithm. The representation is implemented here in the xy-plane with arbitrary coordinates.

Figure 2:
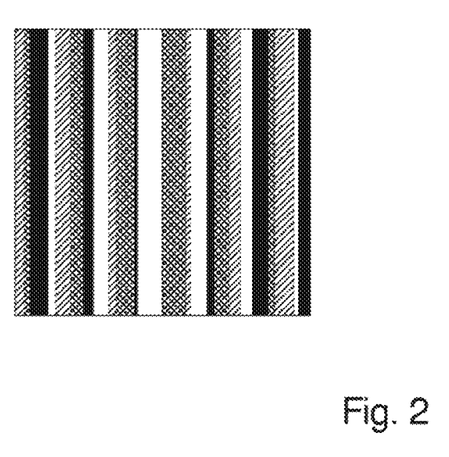
FIG. 2 shows the overall phase mask belonging to the first example.

Then, using the method described above, it is possible to generate a phase mask which combines the desired imaging behavior of the two individual phase masks from FIG. 1a) and which can be displayed on an LCOS-SLM. The resultant phase mask is shown in FIG. 2, with different hatching representing different phase shifts. Here, the phase shifts are different for each of the two wavelengths, even in the same region.

Figure 3:
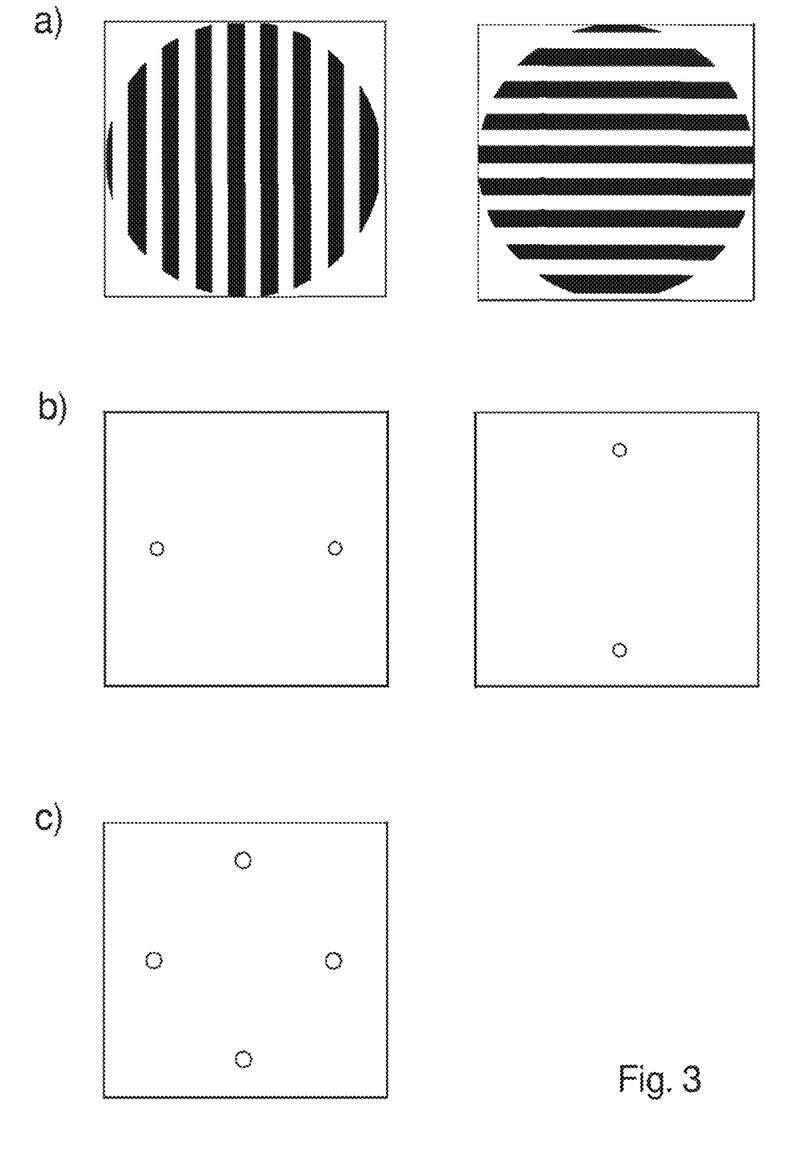
FIG. 3 shows a second example for target phase functions for two wavelengths.
Figure 4:
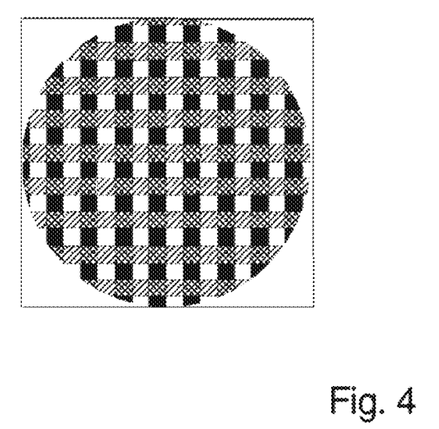
FIG. 4 shows the overall phase mask belonging to the second example.

A development of FIG. 1 is shown in FIG. 3. In contrast to FIG. 1, the orders of diffraction of the two wavelengths are arranged on lines that intersect at an angle of 90° in the masked 0th order of diffraction. FIG. 3a) shows the target phase masks for the two individual wavelengths, FIG. 3b) shows the resultant diffraction patterns in the far field or the diffraction patterns from which the target phase functions are calculated, and FIG. 3c) shows the superposition of the two diffraction patterns of FIG. 3b). Here, the direction of the effect of the phase element depends on the wavelength, which can be exploited during structured illumination microscopy by virtue of the direction of the arrangement of the orders of diffraction changing in the pupil in the case of small wavelength changes. If a corresponding overall phase mask is determined by means of the above-described method, said overall phase mask can be realized by means of an LCOS-SLM in an intermediate image plane and, by switching through the wavelengths, it is possible by way of the wavelength variation to switch through the minimum of three directions of the orders of diffraction required for such an illumination microscopy, which must include an angle of 120° with respect to one another in a pupil plane. The arising optimized overall phase mask is illustrated in FIG. 4; different hatching/filling corresponds to different phase shifts in this case too.

Figure 5:
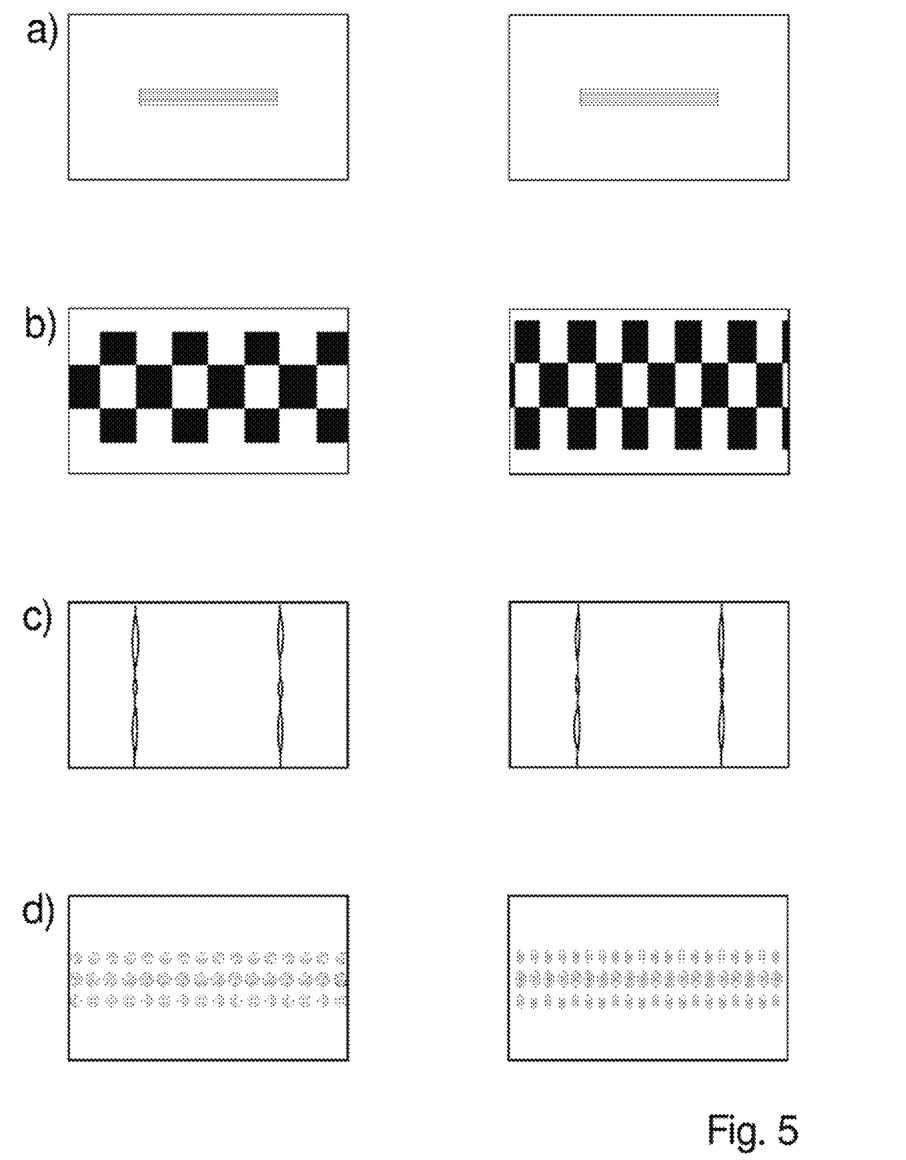
FIG. 5 shows a third example for target phase functions for two wavelengths.

The above-described method can also be used to determine an overall phase mask for generating a multichromatic light sheet, wherein the shape of a multichromatic light sheet, preferably the shape of a multichromatic sinc$^3$ beam, is impressed on the illumination light, i.e., the light used for illumination purposes. This should be explained on the basis of FIG. 5 and FIG. 6. Once again, the phase plate should be realized or simulated by an LCOS-SLM. Once again, the two wavelengths $\lambda_1$=488 nm and $\lambda_2$=561 nm are used. The representations on the left-hand side of FIGS. 5a)-d) relate to the wavelength of 488 nm in this case; the representations on the right-hand side relate to the wavelength of 561 nm. FIG. 5a) initially shows the illumination of the spatial light modulator; the illumination is already implemented in light-sheet-type fashion but still is unstructured. Here, the different lines denote different intensities; the intensity is greatest in the center. The target phase functions for both wavelengths $\Delta\varphi_i$ are illustrated in FIG. 5b); the corresponding diffraction patterns in a pupil plane are shown in FIG. 5c). The resultant individual, structured light sheets sinc$^3$ beams are illustrated in FIG. 5d). While the intensities are congruent to the pupil plane, the target phase functions, and hence also the light sheets, differ in the sample region.

Figure 6:
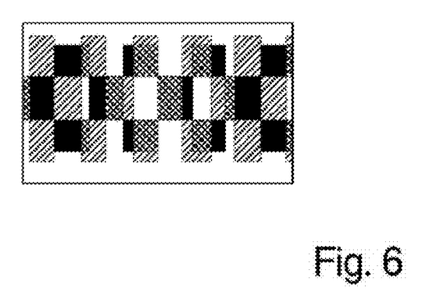
FIG. 6 shows the overall phase mask belonging to the third example.

The resultant phase plate, which can be realized either from a material with a location-dependent, varying thickness or on an LCOS-SLM with a constant thickness but location-dependent varying voltage and hence location-dependently varying refractive index, is illustrated in FIG. 6. Here, in the regions filled in white, the phase deviation is 0π for both wavelengths; i.e., there is no phase shift. In the regions labeled by crosshatching, there is a phase shift of 1.1π for the wavelength of 488 nm and a phase shift of 0.93π for the wavelength of 561 nm. In the regions labeled by oblique hatching from bottom left to top right, there is a phase shift of 3.8π for the wavelength $\lambda_1$ and a phase shift of 3.25π for the wavelength $\lambda_2$. Finally, the regions filled in black denote a phase shift of 4.88π for the wavelength $\lambda_1$ and of 4.15π for the wavelength $\lambda_2$.

Figure 7:
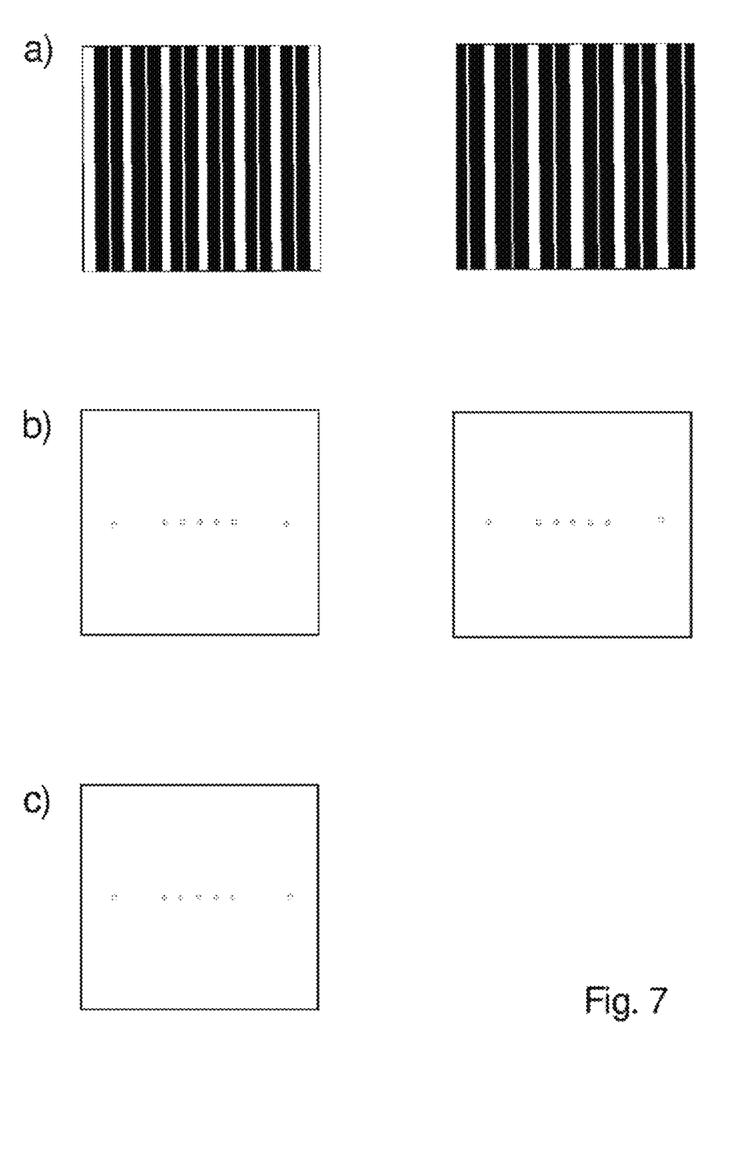
FIG. 7 shows a fourth example for target phase functions for two wavelengths.
Figure 8:
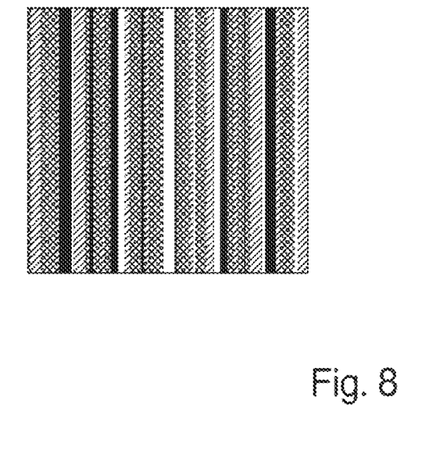
FIG. 8 shows the overall phase mask belonging to the fourth example.

A further example is shown in FIGS. 7 and 8; here, a diffraction maximum distribution is specified as illumination light structure for each of the two wavelengths $\lambda_i$, as arises in the case of a Dammann grating, which only generates odd diffraction maxima, for example, arranged in a pupil plane. The two Dammann gratings that should be arranged in pupil planes are illustrated in FIG. 7a); a multispot pattern, which is respectively illustrated in FIG. 7b) for both wavelengths, is respectively generated therewith in the region of the sample. Here, the periods of the two target phase functions in FIG. 7a) were chosen in such a way that the points are respectively at the same location in this case. The superposition of the two diffraction patterns is illustrated in FIG. 7c). One of the two phase shifts in accordance with the overall phase mask realizing target phase functions $\Delta\varphi_i$ is illustrated in FIG. 8; using the latter, it is possible to generate the superposed diffraction pattern illustrated in FIG. 7c). Regions filled differently again describe different phase shifts in this case too. In the white regions there is no phase shift, neither for the wavelength $\lambda_1$=488 nm nor for the wavelength $\lambda_2$=561 nm. In the crosshatched regions, the phase deviation is 1.1π for $\lambda_1$ and 0.93π for $\lambda_2$. In the regions hatched obliquely from bottom left to top right, the phase deviation is 3.82π for $\lambda_1$ and 3.24π for $\lambda_2$. In the regions filled in black, the phase shift is 4.90π for $\lambda_1$ and 4.13π for the wavelength $\lambda_2$.

Using the method described above, it is possible—particularly when using LCOS-SLM—to generate multichromatic illumination patterns in a simple manner, in the case of which, for example, the relative positions of the orders of diffraction are identical for a plurality of different illumination wavelengths in a pupil plane, without having to resort to complex technology such as photonic integrated circuits, for example. This yields great cost savings, for example because there is no need to use photonic integrated circuits that are specifically matched to the respective illumination structure.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for illuminating samples in microscopic imaging methods, comprising
    selecting a number m of different wavelengths $\lambda_i$, with m>1 and i=1, . . . , m, for illumination purposes,
    specifying a target phase function $\Delta\varphi_i(x, y, \lambda_i)$ for each of the wavelengths $\lambda_i$, where x and y denote spatial coordinates in a plane perpendicular to an optical axis z and wherein each target phase function $\Delta\varphi_i(x, y, \lambda_i)$ effectively only acts for the respective wavelength $\lambda_i$,
    specifying the target phase functions $\Delta\varphi_i(x, y, \lambda_i)$ based on a structure of the sample or an illumination light structure or beam shape to be impressed on light used for illumination purposes,
    wherein said target phase functions at least approximately satisfy a system of equations (G1)

$$\begin{pmatrix} \dfrac{\Delta\varphi_1(x, y, \lambda_1)}{2\pi} \\ \dfrac{\Delta\varphi_2(x, y, \lambda_2)}{2\pi} \\ \vdots \\ \dfrac{\Delta\varphi_m(x, y, \lambda_m)}{2\pi} \end{pmatrix} = \quad \text{(G1)}$$

$$\begin{pmatrix} \dfrac{(n_1(\lambda_1)-1)}{\lambda_1} & \dfrac{(n_2(\lambda_1)-1)}{\lambda_1} & \cdots & \dfrac{(n_m(\lambda_1)-1)}{\lambda_1} \\ \dfrac{(n_1(\lambda_2)-1)}{\lambda_2} & \dfrac{(n_2(\lambda_2)-1)}{\lambda_2} & \cdots & \dfrac{(n_m(\lambda_2)-1)}{\lambda_2} \\ \vdots & \vdots & \ddots & \vdots \\ \dfrac{(n_1(\lambda_m)-1)}{\lambda_m} & \dfrac{(n_2(\lambda_m)-1)}{\lambda_m} & \cdots & \dfrac{(n_m(\lambda_m)-1)}{\lambda_m} \end{pmatrix} \begin{pmatrix} D_1 \\ D_2 \\ \vdots \\ D_m \end{pmatrix},$$

where $D_i$ denotes a location-dependent or constant thickness of an optically effective material $M_i$ with a wavelength-dependent refractive index $n_i$, wherein the refractive index $n_i$ is location-dependent if the thickness is constant and wherein an overall phase mask realizing the target phase functions $\Delta\varphi_i$ is generated based on a solution to the system of equations (G1);

generating an overall phase mask, which realizes the m target phase functions $\Delta\varphi_i$, and illuminating the sample simultaneously or successively with coherent light of the wavelengths $\lambda_i$ via the overall phase mask.

2. The method as claimed in claim 1, wherein that the same optically effective material M with a location-dependent thickness D(x, y) is used for all wavelengths $\lambda_i$.

3. The method as claimed in claim 2, further comprising using a transmissive spatial light modulator or a liquid crystal layer arranged on a silicon substrate (LCOS) with a constant thickness as part of a spatial light modulator as optically effective material and a phase is set by way of a refractive index difference $\Delta n$ that depends on an applied, location-dependent voltage U.

4. The method as claimed in claim 1, wherein an illumination light structure that increases resolution is impressed on the light used for illumination purposes.

5. The method as claimed in claim 4, wherein the illumination light structure comprises, for each of the wavelengths $\lambda_i$, at least two diffraction maxima, differing from the 0th order, corresponding to two orders of diffraction which are arranged in a common pupil plane, wherein the diffraction maxima at the same wavelength $\lambda_i$ are respectively arranged along a straight line and the diffraction maxima of the zeroth order of diffraction lie congruently on one another for all wavelengths $\lambda_i$ and wherein the remaining diffraction maxima of the same orders either lie congruently on one another for all wavelengths $\lambda_i$ or lie on lines that are rotated with respect to one another by an offset angle that depends on the number m of wavelengths $\lambda_i$.

6. The method as claimed in claim 1, wherein the illumination light structure comprises, for each of the wavelengths $\lambda_i$, diffraction maxima corresponding to a Dammann grating arranged in a pupil plane, wherein the respective same orders of diffraction are congruent for all wavelengths $\lambda_i$.

7. The method as claimed in claim 1, further comprising generating, for at least one of the wavelengths $\lambda_i$, target phase function $\Delta\varphi_i(x, y, \lambda_i)$ by means of a Gerchberg-Saxton algorithm on account of an intensity distribution specified for this wavelength $\lambda_i$.

8. The method as claimed in claim 1, further comprising impressing the form of a multichromatic light sheet.

9. The method as claimed in claim 1, wherein a plurality of regions of interest are defined within the sample before the target phase functions $\Delta\varphi_i(x, y, \lambda_i)$ are determined, the wavelengths $\lambda_i$ of the light used to illuminate a region of interest are defined for each region of interest, and an illumination light structure by means of which only the regions of interest are illuminated with light of the respectively selected wavelengths $\lambda_i$ is defined.

10. The method as claimed in claim 8, wherein said multichromatic light sheet is a multichromatic $\text{sinc}^3$ beam.

\* \* \* \* \*

UNITED STATES PATENT AND TRADEMARK OFFICE
CERTIFICATE OF CORRECTION

PATENT NO. : 11,555,991 B2
APPLICATION NO. : 17/057847
DATED : January 17, 2023
INVENTOR(S) : Joerg Siebenmorgen and Ralf Netz It is certified that error appears in the above-identified patent and that said Letters Patent is hereby corrected as shown below:

In the Specification

Column 4, Line 33    now reads: "mask this"
should read: -- mask – this --

Column 4, Line 35    now reads: "masks is generated"
should read: -- masks – is generated --

Column 4, Line 39    now reads: "thicknesses also thicknesses varying in the location-dependent fashion which"
should read: -- thicknesses – also thicknesses varying in the location-dependent fashion – which --

Column 5, Line 17    now reads: "index" Weather....
should read: -- index $n_j$. -- Weather...

Column 5, Line 31    now reads: "M with the respective"
should read: -- $M_j$ with the respective --

Column 7, Line 18    now reads: "n°LC"
should read: -- $n^e_{LC}$ --

Column 10, Line 20    now reads: "material n is constant."
should read: -- material $M_j$ is constant. --

Column 10, Line 22    now reads: "material n is constant."
should read: a material $M_i$ is constant. --

Column 10, Line 26    now reads: "n with the location-dependent thicknesses"

Signed and Sealed this
Thirteenth Day of February, 2024

*Katherine Kelly Vidal*
Katherine Kelly Vidal
*Director of the United States Patent and Trademark Office* should read: -- $M_i$ with the location-dependent thicknesses --

Column 11, Line 52  now reads: "sinc³ beams"
should read: -- -sinc³ beams- --